United States Patent Office 3,839,478
Patented Oct. 1, 1974

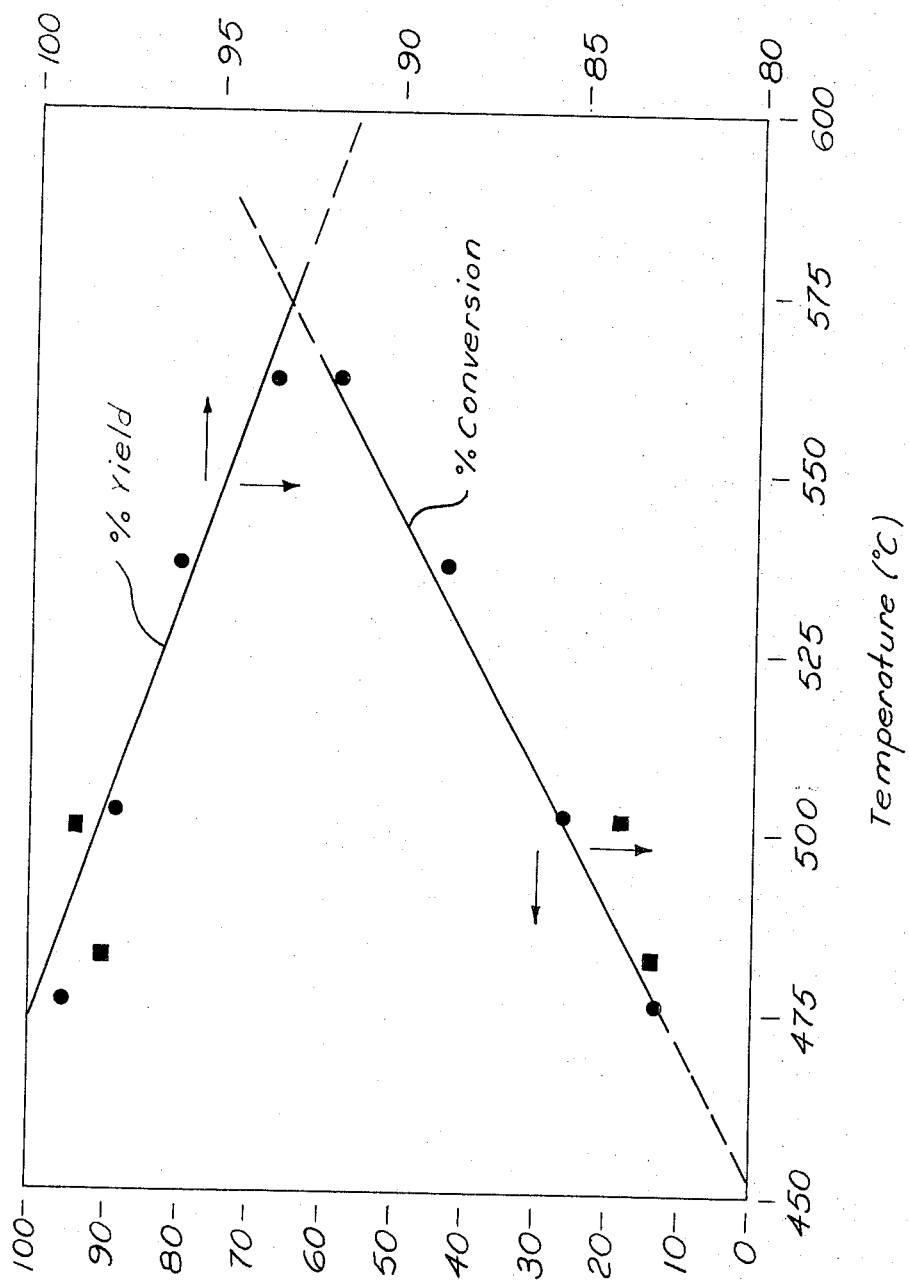

3,839,478
DEHYDROGENATION OF ETHYLBENZENE TO STYRENE IN THE PRESENCE OF A HALO-HYDROCARBON
Johnny Berten Gardner, Lake Jackson, Tex., assignor to The Dow Chemical Company, Midland, Mich.
Filed Mar. 12, 1973, Ser. No. 340,589
Int. Cl. C07c 5/18, 5/10
U.S. Cl. 260—669 R                12 Claims

ABSTRACT OF THE DISCLOSURE

Ethylbenzene is dehydrogenated to styrene in the presence of a halogenated aromatic hydrocarbon and steam. Although the effect on the conversion is noted in the absence of a catalyst, i.e. where the reaction is thermal, the use of a catalyst, e.g. Pd, makes possible conversions of about 60% with styrene yields of above 90%.

BACKGROUND OF THE INVENTION

The process of dehydrogenating ethylbenzene with steam at elevated temperatures over various catalysts is well known to the art and the use of iron oxide catalysts provides commercially acceptable processes. One of the problems of the art is that too high a temperature causes excessive cracking of the starting material and products and loss of yield of desired product.

Various ways have been sought to maintain or improve the yields of unsaturated hydrocarbon while avoiding the formation of degradation products. One of these (U.S. 3,383,429) employs steam and oxygen in the presence of bromine or a bromine-yielding compound over a catalyst of calcium nickel phosphate. The patent teaches that the bromine-yielding compound may be for example $NH_4Br$, HBr, or 1,2-dibromobutane and temperatures employed are in the range of from 400° to 700° C. Bromine (or bromine-yielding compound) is used in an amount of from 1 to 20 mole percent based on the hydrocarbon. Although ethylbenzene is claimed as a reactant, no example of it is given.

Another reference (U.S. 3,271,469) employs temperatures of 200° to 400° C. for the dehydrogenation of ethylbenzene, conducting the reaction in the presence of a tetrahalide of carbon, e.g. bromotrichloromethane and dichlorodifluoromethane. Mole ratios of hydrocarbon to tetrahalide employed are from 1 to 1 to 20 to 1.

Extremely small amounts (200–1000 p.p.m.) of certain chlorinated compounds e.g. ethylene dichloride, trichloroethylene and ethylchloride are employed in U.S. 3,179,707 in conjunction with an alkali-promoted iron oxide catalyst. This patent states that "stable compounds such as chlorobenzenes—are ineffective under dehydrogenation reaction condition." However, $\alpha$-chloroethylbenzene is taught as effective.

The use of alkylhalides as taught by the art gives rise to numerous undesirable by-products which must be separated from the desired olefinic product as shown by the following experiment done according to the prior art.

DEHYDROGENATION OF ETHYLBENZENE

The reaction of ethylbenzene (50 mole percent) and bromotrichloromethane —$CBrCl_3$— (50 mole percent) in the presence of steam (steam/oil weight ratio is 1, i.e. the weight of steam compared to that of total hydrocarbon including the chlorinated hydrocarbon) as taught in the art was conducted by passing the vaporized reactants through a tubular reactor heated to a temperature of about 450° C. The reactor was packed with ¼" Berl saddles. The LHSV was 0.5.

While 50–60% of the ethylbenzene was converted to styrene and 20–30% of the ethylbenzene was recovered, an additional 20–30% of by-products was obtained Chloroform accounted for more than 60% of the total by-products, another 30% consisted of about equal amounts of trichloroethyltoluene, carbon tetrachloride and dichloroindane with lesser amounts of other compounds, such as dichlorobromomethane, hexachloroethane, bromostyrene, chlorovinyltoluene, trichloropropylbenzene, benzylbromide, perchloroethylene and numerous other products of thermal degradation of the original reactants and primary products.

It is apparent from the above data that a rather involved process for recovery and purification of the desired product is required. It would be highly desirable, therefore, to have an improved process in which by-products were minimized or eliminated.

Thus it is an object of the present invention to provide a process for making styrene which has fewer by-products. A further object is to provide a process which gives a higher conversion of ethylbenzene at a given temperature. A still further object is to provide a process which gives substantially the same conversions and yields as commercial processes, but which employs lower temperatures.

It has now been discovered that ethylbenzene can be dehydrogenated to styrene in the presence of steam and a halogen substituted aromatic compound, especially when certain dehydrogenation catalysts are employed.

The Figure shows the relationship of temperature to conversion and yield when employing the process of the invention.

DETAILED DESCRIPTION OF THE INVENTION

The process of the present invention comprises thermally dehydrogenating ethylbenzene at 450° to 650° C., preferably 550° to 600° C., in the presence of steam and a halogenated aromatic compound, e.g. bromobenzene, to obtain styrene. While the reaction proceeds to some extent in the absence of a catalyst, it is more preferred to employ a dehydrogenation catalyst, e.g. calcium nickel phosphate. Substantially, the only products obtained in this improve process are benzene, styrene and a hydrogen halide. The benzene, of course, could be recovered and used to make bromobenzene or ethylbenzene. The hydrogen halide can be reduced to recover the free halogen which in turn could be used to produce the halogenated aromatic used as starting material.

Halogen-substituted aromatic compounds useful as co-reactants (or promoters) are bromobenzene, chlorobenzene, bromochlorobenzenes, iodobenzene, fluorobenzene, dichlorobenzenes, dibromobenzenes, trichlorobenzenes, alkylhalobenzenes where the halo substituent is on the ring, such as the o-, m- and p-halotoluenes, e.g., 1-methyl-3-chlorobenzene, 1-methyl-4-bromobenzene, 1-methyl-2-chlorobenzene and the like and the alkyldihalobenzenes such as 1-ethyl-2, 4-dichlorobenzene, 1-ethyl-3, 5-dibromobenzene and the like in which the halogen atoms may be the same or different. While there is no reason why mixtures of these promoters cannot be used there is no advantage and separation of by-products is made more difficult.

Generally, those catalysts useful in the process of the invention are dehydrogenation catalysts known to the art. Those found to be especially useful are calcium nickel phosphate and strontium nickel phosphate or the metals platinum, palladium, nickel and tungsten and their mixtures or alloys.

The phosphate catalysts are preferably employed unsupported as pellets or chunks, while the metals are preferably placed on or mixed with an inert support such as alumina or silica and used in the reduced form. Other known dehydrogenation catalysts are used in the forms known to the art, supported or unsupported. The alkali promoted iron and other transition metal oxides do not perform satisfactorily in the process of the present invention and are not included herein.

Ethylbenzene and steam are employed in the ratios known to the art. Thus, steam/oil (S/O) weight ratios of from about 0.4 to about 2.0 are operable. A ratio of from about 0.8 to about 1.1 is preferred. This ratio, however, does not appear to be critical so long as sufficient steam is employed to prevent the deposition of carbon deposits in the catalyst bed. Such deposits are removed by the well known water-gas reaction. Pressures employed are those sufficient to flow reactants through the reactor, usually between 1 and 2 atmospheres.

The ratio of ethylbenzene to halogenated aromatic employed is from about 25 moles to one mole EB per mole of halogenated aromatic.

The preferred range is from about 5 to 10 moles of ethylbenzene per mole of halogenated aromatic compound.

The following examples are illustrative of the invention, but are not to be construed as limiting.

EXAMPLE 1

A mixture of 5 weight percent bromobenzene (1.0 mole percent), 45 weight percent ethylbenzene (13.1 mole percent) and 50 weight percent water (85.9 mole percent) was vaporized and passed over a commercially available catalyst consisting of 24% nickel and 76% tungsten on a silica-alumina support in the form of $1/16''$ pellets. The catalyst amounted to 25% based on the total weight of catalyst and support. Temperature of reaction was 489° C. and a S/O ratio of 1.0 and a LHSV (liquid hourly space velocity) of 0.5 were employed. The crude product contained benzene, HBr and styrene, and the original reactants (bromobenzene, ethylbenzene and water). The conversion of ethylbenzene to styrene was 12 percent based on the ethylbenzene fed and selectivity (or yield) to styrene was about 99 percent. For comparison, the same run made at a temperature of 500° C. without bromobenzene gave only a 3 percent conversion of ethylbenzene to styrene.

EXAMPLE 2

In the manner of Example 1, the same quantities of reactants were passed over a commercially available catalyst consisting of 0.6% by weight platinum on alumina, the support being substantially the same form as that of Example 1. At a reaction temperature of 509° C., a S/O ratio of 1, and a LHSV of 5.0 the conversion of ethylbenzene to styrene was 15 percent with a selectivity of about 98 percent.

Without using any catalyst the procedure of Examples 1 and 2 gave less than 0.2% conversion of ethylbenzene to styrene at 500° C.

EXAMPLE 3

In the manner of Example 1 the same reactants were used over other catalysts at a mole ratio of EB/BB of 1.5, a S/O ratio of 1 and a LHSV of 0.5. The results are shown below:

TABLE I

| Catalyst | Support | Temp. (° C.) | Conversion EB to styrene (percent) |
|---|---|---|---|
| CaNiPO$_4$ ($3/16''$ pellets) | None | 465 | 3.5 |
| Do | do | 480 | 4.0 |
| SrNiPO$_4$ | do | 460 | 8.0 |
| SrNiPO$_4$ | do | 480 | 10.0 |
| Pd | Al$_2$O$_3$ | 460 | 20.0 |
| Pd | Al$_2$O$_3$ | 480 | 13.5 |

Ethylbenzene together with chlorobromobenzene was fed over a CaNiPO$_4$ catalyst under substantially the same conditions of temperature, S/O ratio and contact time. Chlorobenzene (CB) also performs in a similar manner over the same catalysts as a promoter for the dehydrogenation of ethylbenzene to styrene. The chlorobenzene was used at a mole ratio of EB/CB of 21/1.

EXAMPLE 4

Over $1/8''$ pellets of a commercial catalyst consisting of 0.3% palladium and the balance alumina was passed a mixture consisting of ethylbenzene (EB) and bromobenzene (BB) at a mole ratio of 1.5, a temperature of 564° C., a S/O weight ratio of 1.0 and a LHSV of 0.5. A conversion of 58% ethylbenzene to styrene and a yield of 93.3% styrene was obtained.

It is generally found that the selectivity is reduced to about 90% when the conversion of ethylbenzene is increased to about 60% and above. At lower conversions of about 10–20% the selectivity becomes 99–100%. To get the conversion up to a practical level of 50–60%, however, the temperature employed must be above about 550° C. This is apparent from the following examples.

EXAMPLE 5

The dehydrogenation of ethylbenzene was conducted over the palladium catalyst of Example 4 in the presence of bromobenzene at S/O weight ratio of 1.0, a EB/BB mole ratio of 1.5 and a LHSV of 0.5 at various temperatures. Table II shows the conversions and yields obtained and these are graphically presented in the Figure.

TABLE II

| Temperature (° C.) | Conversion* (percent) | Selectivity* (percent) |
|---|---|---|
| 477 | 12.7 | 99.2 |
| 490 | 15.3 | 99.3 |
| 495 | 17.2 | 98.3 |
| 500 | 18.6 | 98.4 |
| 503 | 25.7 | 97.7 |
| 538 | 43.0 | 96.0 |
| 564 | 58.0 | 93.3 |

*Conversion and selectivity are shown with reference to styrene, i.e. ethylbenzene converted to styrene and the yield of styrene as a percentage of the total ethylbenzene converted.

EXAMPLE 6

Two additional experiments were made in the manner of Example 5, using the same catalyst and a EB/BB mole ratio of 1.5, but at a S/O ratio of 0.4 and temperatures of 483° and 500° C., respectively. These runs are shown in the Figure as squares on both yield and conversion curves. At 483° C. the conversion to styrene was 13.8% and the yield was 98.6% while at 500° C. the respective figures were 18.6% and 98.4%.

I claim:

1. In a process for making alkenylaromatic hydrocarbons by dehydrogenating alkylaromatic hydrocarbons in the presence of steam at an elevated temperature the improvement which comprises employing at least one aromatic halogenated hydrocarbon and conducting the reaction in the presence of a dehydrogenation catalyst.

2. The process of Claim 1 in which the catalyst is calcium nickel phosphate or strontium nickel phosphate.

3. The process of Claim 1 wherein the halogenated aromatic compound is a halogenated benzene.

4. The process of Claim 3 wherein the halogenated benzene is bromobenzene.

5. The process of Claim 3 wherein the halogenated benzene is chlorobenzene.

6. The process of Claim 3 wherein the halogenated benzene is a chlorobromobenzene.

7. The process of Claim 1 wherein the catalyst is employed on an alumino or silica support.

8. The process of Claim 1 wherein the mole ratio of alkyl aromatic to halogenated aromatic is from 1/1 to 20/1.

9. The process of Claim 1 wherein the mole ratio of alkylaromatic to halogenated aromatic is 5/1 to 10/1.

10. The process of Claim 1 wherein the catalyst is metallic palladium, platinum, nickel, tungsten, or mixture thereof on an inert support.

11. A process for making styrene which comprises dehydrogenating ethylbenzene in the presence of steam and a halogenated aromatic hydrocarbon over a dehydrogenation catalyst at a temperature of 450° to 650° C., a mole ratio of ethylbenzene to halogenated aromatic hydrocarbon of 1/1 to 20/1 and a steam to hydrocarbon weight ratio of 0.4/1 to 2/1 under a pressure of from about 1 to 2 atmospheres.

12. The process of Claim 11 wherein the temperature is in the range 550° to 600° C.

References Cited

UNITED STATES PATENTS

| | | | |
|---|---|---|---|
| 3,383,429 | 5/1968 | Noddings | 260—669 R |
| 3,274,285 | 9/1966 | Bajars | 260—669 R |
| 3,449,457 | 6/1969 | Downs et al. | 260—669 R |
| 3,702,875 | 11/1972 | Manning et al. | 260—669 R |
| 3,706,811 | 12/1972 | Duke | 260—669 R |

CURTIS R. DAVIS, Primary Examiner

PO-1050
(5/69)

UNITED STATES PATENT OFFICE
CERTIFICATE OF CORRECTION

Patent No. 3,839,478     Dated Oct. 1, 1974

Inventor(s) J. B. Gardner

It is certified that error appears in the above-identified patent and that said Letters Patent are hereby corrected as shown below:

Col. 3, line 51, "5.0" should be --0.5--.

Col. 4, line 72, "alumino" should be --alumina--.

Signed and sealed this 11th day of February 1975.

(SEAL)
Attest:

RUTH C. MASON
Attesting Officer

C. MARSHALL DANN
Commissioner of Patents
and Trademarks